June 14, 1960   J. E. McKEE ET AL   2,940,506
MATERIAL HANDLING MECHANISM

Filed July 10, 1958   3 Sheets-Sheet 1

INVENTORS
JAMES E. McKEE AND
JOHN L. REHMAN
By
Bates, Teare & McBean
ATTORNEYS

June 14, 1960 J. E. McKEE ET AL 2,940,506
MATERIAL HANDLING MECHANISM
Filed July 10, 1958 3 Sheets-Sheet 3

INVENTORS
JAMES E. McKEE AND
JOHN L. REHMAN
By
Bates, Teare & McBean
ATTORNEYS

United States Patent Office 2,940,506
Patented June 14, 1960

2,940,506

MATERIAL HANDLING MECHANISM

James E. McKee, Cuyahoga Falls, and John L. Rehman, Barberton, Ohio, assignors to The Akron Standard Mold Company, Akron, Ohio, a corporation of Ohio Filed July 10, 1958, Ser. No. 747,792

10 Claims. (Cl. 154—42)

This invention relates in general to machines for handling strip or sheet material in a generally continuous process, and more particularly to an apparatus for splicing or securing together adjacent ends of individual strips or batches of such sheet material, for the effective handling of the material in a generally uninterrupted manner by the machine.

Machines of the above mentioned type are utilized in a variety of indiustrial applications, such as for instance, the handling and processing of uncured sheet or strip rubber material; such uncured rubber sheet material may be efficiently removed from a mixing mill or similar compound mixer device by such a machine generally known in the rubber industry as a "batch-off" machine, after which the latter may pass the sheet material to other equipment for further processing. Such a "batch-off" machine and associated processing equipment generally require, or are preferably provided with, an endless strip of sheet rubber material, and therefore the problem arises of splicing adjacent ends of individual batches of rubber material as they are taken off the mixing mill in sheet or strip form, and commence their progression through the continuous processing or handling equipment.

The present invention provides a novel splicer mechanism for use in providing an endless strip of sheet stock material which may be produced in or from individual batches or runs, and then splicing or connecting the adjacent ends of the individual batches of the stock material together in an expeditious manner by means of the aforementioned splicer mechanism. The splicer mechanism may either be operator actuated and controlled or may be controlled in an automatic system for sequential automatic actuation in a continuous cycle of operation of the associated machine.

Accordingly, an object of the invention is to provide a splicer mechanism for splicing together adjacent and overlapping ends of individual strips of pliable or plastic-like material, to form the latter into an endless run of such material.

Another object of the invention is to provide a splicer mechanism of the above mentioned type which is fluid actuated and which is effective to crimp the overlapping ends of the pliable material into positive interlocking relationship, to form a continuous run of such material.

A further object of the invention is to provide a splicer mechanism comprising opposed, rotatable, gear elements between which overlapped ends of the sheets of material which are to be spliced together are passed, together with a fluid actuated motor unit which is adapted to selectively move at least one of the gears into and out of coaction with the other of the gears to thereby cause embedding of the gear teeth in the overlapping ends of the material being spliced, thereby deforming or crimping, and thus connecting the latter material into an uninterrupted run.

A still further object of the invention is to provide strip handling mechanism in conjunction with the above splicing apparatus for facilitating the overlapping of adjacent ends of separate strips of sheet material in a generally automatic operating arrangement, prior to their progression through the splicing apparatus.

Other features and advantages of the invention will be apparent from a consideration of the following description taken in conjunction with the accompanying drawings wherein.

Figure 1:
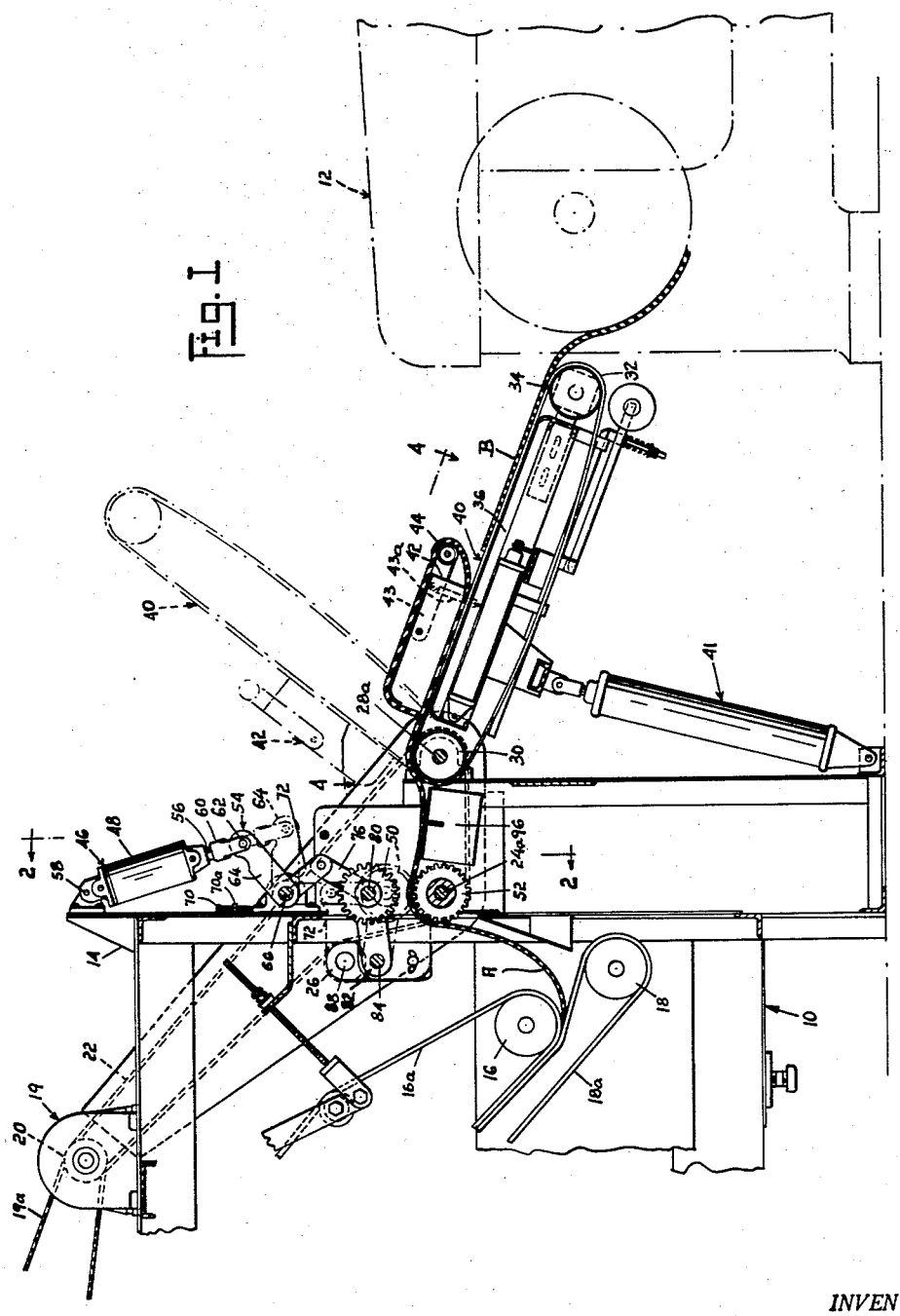
Fig. 1 is a side elevational, partially sectioned view of a machine embodying the invention.
Figure 2:
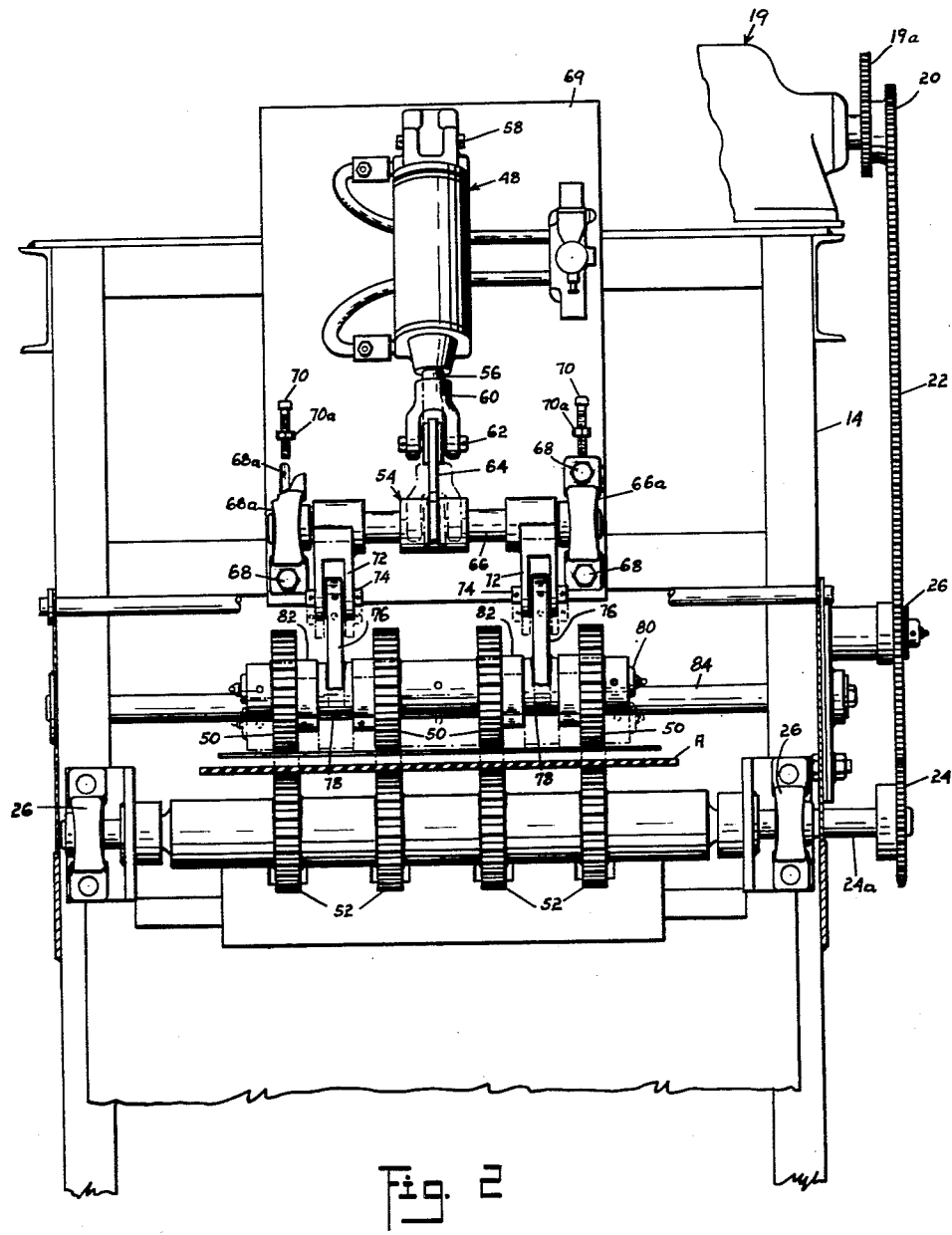
Fig. 2 is an enlarged, end elevational view taken substantially along the plane of line 2—2 of Fig. 1, looking in the direction of the arrows.
Figure 4:
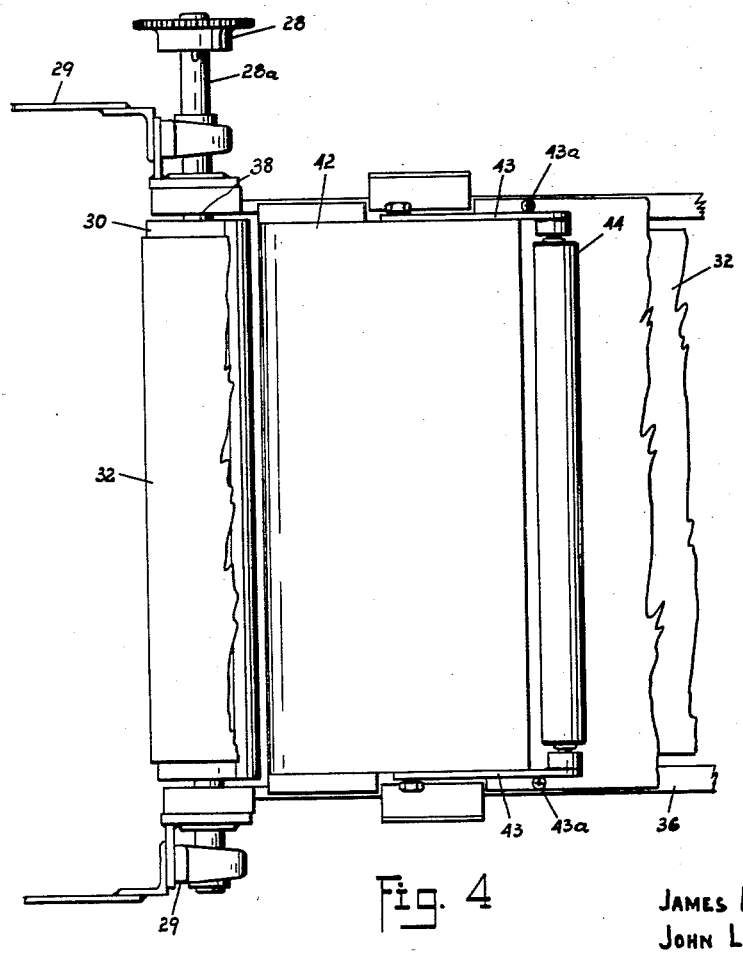
Fig. 4 is an enlarged, broken, fragmenary view taken substantially along line 4—4 of Fig. 1, looking in the direction of the arrows.

Referring again to the drawings, there is shown a machine generally designated by reference number 10 which may be of the aforementioned "batch-off" type and which is adapted for the continual handling and/or processing of strip or sheet-like stock material, such as uncured rubber material. A mixing mill or compounding device of conventional type and generally referred to by number 12, is disposed at the head end of machine 10 for feeding strips or sheets of stock material to the machine. The machine 10 comprises the frame-work 14 on which are mounted various components of the machine including rollers 16 and 18 which have endless belts or tapes 16a and 18a respectively, associated therewith for progressing the stock material A through the machine. Rollers 16 and 18 and associated tapes or belts 16a and 18a are driven by a motor 19 mounted on the machine frame 14 and operatively connected to the latter rollers and belts by a drive chain 19a and other conventional driving mechanism not forming part of the instant invention and therefore not shown. Motor 19 is also operatively connected by means of pulley or sprocket 20 and chain or belt 22 to a sprocket or pulley element 24, secured to shaft 24a journaled on frame 14 by means of bearing structure 26 (Fig. 2). Thus upon driving of sprocket member 20 by motor 19, sprocket member 24 and associated shaft 24a rotate therewith. Chain 22 is also entrained about idler pulley or sprocket 26 rotatably mounted on frame 14 and about sprocket 28 which is secured to a shaft 28a (Figs. 1 and 4). Shaft 28a is rotatably mounted on main frame 14 by bracket and bearing structure 29 (Fig. 4) and has a drum element 30 secured thereto for carrying and driving an endless belt 32 entrained about drum 30 and a longitudinally spaced associated drum 34 (Fig. 1). Drum 34 is journaled and supported on frame work 36 which in combination with belt 32, provides a work table or platform 40 which is hinged as at 38 to shaft 28a for pivotal adjusting movement in a generally vertical plane, the maximum pivotal movement of such platform being illustrated in dot-dash lines in Fig. 1. A double acting fluid powered piston and cylinder motor unit 41 is provided for so adjusting the position of work platform 40. Mounted above belt 32 in generally straddled relation therewith and supported on framework 36 is an auxiliary platform structure 42. Platform 42 at its outer or right hand end (as viewed in Figs. 1 and 4) includes an idle roller member 44. Roller 44 is journaled to rocker structure 43 (Fig. 4) of platform 42 and is resiliently maintained in a predetermined position with respect to main work platform 40 by tension springs 43a. Platform 42 is adapted to receive in flipped-over supporting relation, the free, trailing end of the strip or run A of stock material preparatory to the placing of the latter in overlapped relation with the leading end of a new strip or run B (Fig. 1) of stock material coming off the mixing mill device 12.

Endless belt 32 and associated supporting drum members 30 and 34, together with auxiliary platform or rack 42 and associated idler roller member 44, therefore define a work structure for readily handling and positioning adjacent ends of individual runs or strips of stock material, for the expeditious splicing thereof, in a manner to be hereinafter described in detail.

In accordance with the invention, a splicer mechanism generally designated by number 46 is provided for connecting together the adjacent ends of individual strips or batches of stock material such as the aforementioned runs A and B, for progression through the machine 10. Mechanism 46 comprises, in general, a double-acting, fluid-operated piston and cylinder motor unit 48, sets of rotatable stitcher gear elements 50 and 52 respectively, adapted for intermeshing coaction with one another and with the overlapped ends of the individual stock sheets or strips which are to be spliced, and linkage means 54 operatively connecting the piston rod 56 of motor unit 48 to the stitcher gear elements 50, for moving the latter into and out of coacting relation with the other of the stitcher gear elements 52. Motor unit 48 is pivotally connected at one end, as at 58, to frame work 14, and the outer end of the piston rod 56 thereof is provided with a clevis 60 which is pivotally connected as at 62 to an adjacent end of crank or lever member 64 (Figs. 1 and 2). Crank 64 is secured at its other end to shaft 66 which is suitably journaled in bearing structure 66a mounted on frame 14. Bearing structure 66a is removably connected to frame 14 for limited adjusting movement in a vertical direction, by means of fastener elements 68 in connection with vertically elongated slots 68a in plate 69 of the frame. Adjusting bolts 70 coacting with nut elements 70a secured to plate 69, are for readily adjusting the vertical position of bearing structure 66a and associated shaft 66 with respect to plate 69. Secured to shaft 66 adjacent the ends thereof are a pair of clevis-like linking or lever members 72 which in turn are pivotally connected, as at 74, to the free ends of link elements 76 secured to collar members 78 which are supported for relative rotary movement on a shaft 80.

Shaft 80 and associated rotatable stitching gear elements 50 are mounted on frame 14 for pivotal or swinging movement in a generally vertical arc by arm elements 82 (Fig. 1) connected at one end to the shaft 80 and at the other end being pivotally mounted on a rod or shaft 84 extending transversely of frame 14, such rod or shaft being supported adjacent its outer ends by frame 14 (Fig. 2). The bottom or lower stitcher gear elements 52 are secured to the aforementioned shaft 24a which as aforesaid is power driven by motor unit 19. It will be noted that the lower gear elements 52 are rotatably mounted on a substantially fixed axis while the upper gear elements 50 are rotatably mounted on a pivotal or movable axis.

Figure 3:
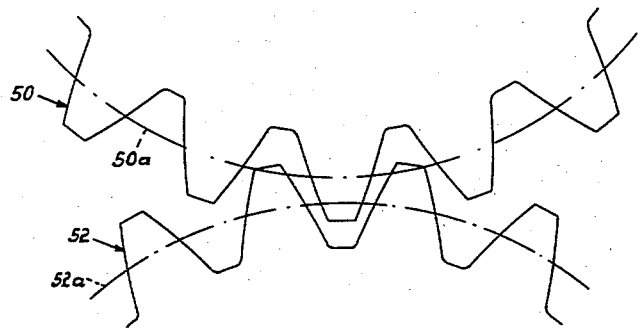
Fig. 3 is an enlarged, diagrammatic illustration of the coaction between the teeth of the gear elements of the splicer mechanism when the latter is in operative or splicing position.

Operation of the mechanism to effect splicing of adjacent ends of individual runs or batches of sheet stock material is as follows: When the trailing end of sheet or run A of stock material reaches the outer end of loading or conveyor structure 40, or is severed from the remainder of the sheet of material at this position, whatever the case may be, the free end of sheet A is then flipped over the platform or rack structure 42 mounted on platform 40, as shown in Fig. 1 of the drawings. The leading end of another sheet or batch B of stock is then positioned on belt 32 of work table 40 in generally the approximate position illustrated in Fig. 1, and the motor 19 is actuated thereby causing rotation of sprocket elements 24 and 28 and rotation of gear elements 52, as well as forward movement of belt 32. In addition, motor unit 19 causes actuation or movement of belts 16a and 18a in synchronism with belt 32 and gears 52, and thus advancing strips A and B in the direction of the entrance end of machine 10. As the sheet material A is passed through the machine, the free trailing end thereof is automatically pulled off platform or rack structure 42, around idler roll 44, and down into overlying or overlapped relation with the leading end of strip or batch B of stock material which is advanced toward the machine 10 by endless belt 32 of conveyor 40. When the overlapped ends of batches A and B of stock material reach the splicer mechanism 46, motor unit 48 is actuated thereby projecting the piston rod 56 thereof outwardly from its inactive position as shown in full-lines in Fig. 1, to cause pivotal movement of lever 64 and rotational movement of supporting shaft 66 and associated downward pivotal movement of links 72 about the axis of shaft 66. In Fig. 1, in dot-dash lines, are shown the positions of lever 64 and links 72 and 76 in the energized or full forward stroke position of the piston rod 56 of motor unit 48. Pivoting of links 72 causes straightening or inward movement of links 76 thereby causing downward movement of stitcher gears 50 about their pivotal connection 84 to frame 14. Gear elements 50 move downward into partially meshing engagement with the opposing, powered lower gear elements 52, which as aforementioned are secured to shaft 24a journaled on frame work 14. As can best be seen from Fig. 3 of the drawings, only partial engagement occurs between the teeth of stitching gear elements 50 and 52, with a clearance existing between the pitch circles 50a and 52a respectively of such gears. This partial meshing of the gears insures that the overlapped ends of the strips of pliable material can pass between the coacting teeth of the gears and will not be perforated by the gear teeth, but will be merely corrugated and squeezed into crimped interlocking relation. The clearance between the pitch lines can be adjusted somewhat by the aforementioned adjusting structure 68, 68a, 70 and 70a of bearing structure 66a. The overlapped ends of the stock material are supported by table or shelf structure 96 for feeding of the ends into the stitching or splicing mechanism 46 at a slightly upwardly inclined or tipped position, as can be best seen in Fig. 1 of the drawings. This expedites the feeding of the stock material into the splicing mechanism for the effective joining together of the adjacent, overlapped ends thereof. After passing through the stitcher mechanism 46, the spliced sheets of stock material A and B are drawn by belts 16a and 18a through the machine 10 for generally further processing operations. As may be readily seen from Fig. 1, when the gear elements 50 are in operative or splicing position (as shown in dot-dash lines in the latter figure), the linkage elements 72, 76 are disposed in generally columnar relationship, thereby providing an effective and positive embedding of the gear teeth into the sandwiched, overlapping ends of stock material, with substantially no reaction force being exerted on motor unit 48. As aforementioned, the splicer mechanism may be operator controlled or may be disposed in an automatic control system for sequential automatic actuation and deactuation in a continuous cycle of operation of the associated machine. Systems for accomplishing the latter automatic control are known in the art and would preferably include such components as timer units, solenoid actuated control valves etc. suitably keyed in a conventional manner into the main system used for controlling the operations of the associated machine, such as the aforementioned "batch-off" machine.

From the foregoing description and accompanying drawings it will be seen that the invention provides novel mechanism for expeditiously splicing or connecting together adjacent overlapping ends of individual sheets or strips of pliable or low-recovery plastic-like stock material, to form a continuous run of such material. The invention also provides conveyor or platform mechanism for use in conjunction with the above splicer apparatus to expeditiously handle and position the ends of the individual strips or sheets of material that are to be connected, for overlapping relationship and subsequent progression thereof through the splicer or connecting mechanism.

The terms and expressions which have been used are used as terms of description and not of limitation, and there is no intention in the use of such terms and expressions of excluding any equivalents of any of the features described or shown or portions thereof, but it is recognized that various modifications are possible within the scope of the invention claimed.

We claim:

1. A splicer mechanism for crimping together overlapping strips of pliable plastic-like material, such as rubber, of substantial thickness comprising, a frame, at least one pair of generally vertically opposed rotatable toothed elements mounted on said frame and adapted to receive therebetween said pliable material, the lower one of said elements being mounted on an axis fixed relative to said frame, means for power driving said one element, the other of said elements being mounted on an axis movable relative to said frame, said other element being swingable into and out of generally partial meshing relation with said one element, a reciprocable fluid powered motor unit mounted on said frame, and linkage means operatively connecting said motor unit to said other element for swinging the latter into and out of said meshing relation with said one element, said elements when in said meshing relation being adapted to deform the overlapped portions of said material to thereby connect the same together, and an endless power driven conveyor arranged to support the material and feed the latter into the bite of said elements.

2. A splicer mechanism for connecting together into unitary form individual overlapping strips of pliable plastic-like material, such as rubber, of substantial thickness comprising, an upright frame, sets of generally vertically opposed rotatable spur gear elements mounted on said frame and adapted to receive therebetween said pliable material, said sets being disposed in laterally spaced generally aligned relation with respect to one another, the lower one of said gear elements of each set being mounted on an axis fixed relative to said frame, the other of said gear elements being mounted on an axis swingable in a predetermined arc relative to said frame, a reciprocable fluid powered piston and cylinder unit mounted on said frame above said gear elements, and linkage means operatively connecting the piston rod of said unit to said other element for swinging the latter into and out of generally partial meshing relation with said one element to thereby crimp the pliable material disposed therebetween into interlocking relation, said linkage means comprising a shaft extending transverse relative to said frame, a lever secured at one end to said shaft and pivotally connected at the other end thereof to said piston rod of said unit, a second lever secured to said shaft and disposed at a radial angle with respect to said first mentioned lever, a link connected to the free end of said second mentioned lever and rotatably connected at the other end thereof to said other element, said levers and said link being operative to swing said other element into said meshing relation with said first element upon outward movement of said piston rod with respect to its associated cylinder, and an endless belt-type conveyor arranged to support the material and feed the latter into the bite of said elements, said conveyor including means for driving the conveyor in synchronism with said one element of each of said sets.

3. A splicer mechanism in accordance with claim 2 wherein said link and said second mentioned lever are disposed in columnar relation when said other gear element is disposed in meshing relation with said one gear element.

4. In combination, a splicer mechanism for connecting together overlapping adjacent ends of pliable sheet-like material and means for placing said ends in said overlapping relationship prior to their passing through said splicer mechanism, said means comprising a material receiving platform including a conveyor belt defining the upper surface of said platform, and a rack structure disposed in generally straddled relation to said conveyor belt, said rack comprising means for receiving a flipped-over terminal end of one of said sheets of material, and means for driving said conveyor belt in a direction to advance the leading end of the other of said sheets of material to accomplish the overlapping of said ends.

5. In the combination defined by claim 4 wherein said material receiving platform is pivotally mounted for swinging movement in a generally vertical plane.

6. In the combination of claim 5 wherein said material receiving platform is pivoted by means of a fluid operated reciprocable motor unit.

7. In the combination of claim 4 wherein an idler roller is provided on the rearward end of said rack structure to facilitate the movement of said one sheet of stock material from said rack structure into overlapping relation with the leading end of said other sheet of stock material.

8. In the combination of claim 4 wherein said splicer mechanism comprises a pair of opposed gear elements, said elements being mounted so as to be movable relative to one another into and out of meshing relation, and means operatively connected to at least one of said elements for controlling said relative movement thereof.

9. In an apparatus of handling and processing pliable plastic-like material in sheet form, the combination of means for positioning adjacent ends of individual sheets of said material in overlapping relation and means for splicing said overlapped end portions together, said first mentioned means comprising a material receiving platform including an endless conveyor belt defining the upper surface of said platform and a secondary platform disposed in generally straddled relation to said belt and supported on said first platform, said second mentioned means comprising sets of vertically opposed gear elements, said elements being movable with respect to one another into and out of meshing relation, and power means for accomplishing said movement of said elements, said sets of gear elements being disposed in generally aligned relation with said belt for receiving therebetween said material from said first platform, said elements upon actuation of said power means being moved into said meshing relation whereby the teeth of said elements are embedded into said overlapped ends of said material, thereby crimping and squeezing said overlapped ends together to form the individual sheets of material into a continuous run.

10. In an apparatus in accordance with claim 9 wherein said gear elements are rotatable, one set of said elements being mounted on a fixed axis, the other set of said elements being mounted on an axis swingable with respect to said first axis for moving said elements into and out of said meshing relation, and power means operatively connected to said one set of elements and to said belt for driving the same in synchronism with one another.

References Cited in the file of this patent

UNITED STATES PATENTS

| | | |
|---|---|---|
| 1,410,879 | Bither | Mar. 28, 1922 |
| 1,899,185 | Ionni | Feb. 28, 1933 |
| 2,226,181 | Ridderstrom | Dec. 24, 1940 |
| 2,443,749 | Stunkel | June 22, 1948 |